(12) United States Patent
Rad et al.

(10) Patent No.: US 12,026,885 B2
(45) Date of Patent: Jul. 2, 2024

(54) METHOD AND SYSTEM FOR AUTOMATED SEGMENTATION OF BIOLOGICAL OBJECT PARTS IN MRI

(71) Applicant: Siemens Healthcare GmbH, Erlangen (DE)

(72) Inventors: Mohammad Saeed Rad, Lausanne (CH); Benedicte Marechal, Echallens (CH); Tom Hilbert, Lausanne (CH)

(73) Assignee: Siemens Healthcare GmbH, Erlangen (DE)

( * ) Notice: Subject to any disclaimer, the term of this patent is extended or adjusted under 35 U.S.C. 154(b) by 379 days.

(21) Appl. No.: 17/557,404

(22) Filed: Dec. 21, 2021

(65) Prior Publication Data

US 2022/0198670 A1 Jun. 23, 2022

(30) Foreign Application Priority Data

Dec. 21, 2020 (EP) .................................... 20215993

(51) Int. Cl.
*G06T 7/10* (2017.01)

(52) U.S. Cl.
CPC ...... *G06T 7/10* (2017.01); *G06T 2207/10088* (2013.01); *G06T 2207/20021* (2013.01);
(Continued)

(58) Field of Classification Search
CPC ............. G06T 7/10; G06T 2207/10088; G06T 2207/20021; G06T 2207/20081;
(Continued)

(56) References Cited

U.S. PATENT DOCUMENTS

| 9,401,017 B2 * | 7/2016 | Choi .......................... G06T 7/12 |
| 9,568,580 B2 * | 2/2017 | Dale ................ G01R 33/56341 |

(Continued)

FOREIGN PATENT DOCUMENTS

| CN | 109166133 A | * | 1/2019 | ............. G06T 7/136 |
| CN | 111602174 A | * | 8/2020 | ............. A61B 6/032 |

(Continued)

OTHER PUBLICATIONS

Zhou, Tongxue et al.: "A review: Deep learning for medical image segmentation using multi-modality fusion", Array, vol. 3-4, (2019), pp. 100004, XP055802652, ISSN: 2590-0056, DOI: 10.1016/j.array. 2019.100004, URL: https://www.sciencedirect.com/science/article/pii/S2590005619300049/pdfft?md5=48003b1883d474e3d878ea05d442a4a8&pid=1-s2.0-S2590005619300049-main.pdf> 2019.

(Continued)

*Primary Examiner* — Mahendra R Patel
(74) *Attorney, Agent, or Firm* — Laurence A. Greenberg; Werner H. Stemer; Ralph E. Locher

(57) ABSTRACT

A computer-implemented method and system for automated segmentation of anatomical structures of a biological object, include acquiring an MRI image of the object constructed from a set of slices of the object, dividing the set of slices into overlapping groups of consecutive slices, and feeding each overlapping group of consecutive slices as input into a neural network for outputting a labelled map for each inputted slice. For each slice belonging to several overlapping groups, determining for each voxel a final label from specific labels assigned to the voxel by the neural network when considering the labelled maps outputted for the considered slice and assigning to each voxel the final label previously determined for the considered voxel and outputting a final segmentation map of final labels assigned to the (Continued)

voxels of the considered slice. A final 3D segmented image of the object is created from previously obtained final segmentation maps.

10 Claims, 2 Drawing Sheets

(52) U.S. Cl.
CPC .............. *G06T 2207/20081* (2013.01); *G06T 2207/20084* (2013.01); *G06T 2207/30016* (2013.01)

(58) Field of Classification Search
CPC . G06T 2207/20084; G06T 2207/30016; G06T 7/11
USPC ........................................................ 382/128
See application file for complete search history.

(56) References Cited

U.S. PATENT DOCUMENTS

| | | | | |
|---|---|---|---|---|
| 10,034,645 | B1* | 7/2018 | Williams | G06T 3/18 |
| 11,721,428 | B2* | 8/2023 | Brynolfsson | G16H 50/20 |
| | | | | 382/131 |
| 2017/0032518 | A1* | 2/2017 | Behrooz | G06T 7/187 |
| 2017/0161894 | A1* | 6/2017 | Fisher | G06T 7/11 |
| 2018/0122082 | A1* | 5/2018 | Mukherjee | G06T 7/12 |
| 2020/0126236 | A1* | 4/2020 | Rister | G06F 18/2148 |
| 2022/0139531 | A1* | 5/2022 | Wang | G16H 40/60 |
| | | | | 382/128 |

FOREIGN PATENT DOCUMENTS

| | | | | |
|---|---|---|---|---|
| CN | 111986137 A | * | 11/2020 | |
| CN | 112740285 A | * | 4/2021 | ......... G06T 11/60 |
| CN | 114503159 A | * | 5/2022 | ........... G06T 7/0012 |
| EP | 3985605 A1 | * | 4/2022 | ........... G06T 7/0012 |
| WO | WO-2006123272 A3 | * | 5/2007 | ........... G06T 7/0012 |
| WO | WO-2009134820 A2 | * | 11/2009 | ............. G01R 33/54 |
| WO | WO-2018189550 A1 | * | 10/2018 | ............. A61B 5/055 |
| WO | WO-2022020394 A1 | * | 1/2022 | ........... G06T 7/0012 |

OTHER PUBLICATIONS

Zhu, Zhuotun et al.: "A 3D Coarse-to-Fine Framework for Volumetric Medical Image Segmentation", Aug. 2, 2018 (Aug. 2, 2018), XP055802651, URL:https://arxiv.org/abs/1712.00201 [retrieved May 8, 2021].
Yu, Qihang et al.: "Thickened 2D Networks for Efficient 3D Segmentation for Efficient 3D Medical Image Segmentation", Nov. 23, 2019 (Nov. 23, 2019), XP055802650, URL:https://arxiv.org/abs/1904.01150, [retrieved May 8, 2021].
Gareth, James: "Majority Vote Classifiers: Theory and Applications", May 1, 1998 (May 1, 1998) XP055802653, URL: https://web.stanford.edu/-hastie/THESES/gareth_james.pdf.
Akkus, Z., Galimzianova, A., Hoogi, A. et al. "Deep Learning for Brain MRI Segmentation: State of the Art and Future Directions,". J Digit Imaging 30, 449-459 (2017).
F. Milletari, N. Navab and S. Ahmadi, "V-Net: Fully Convolutional Neural Networks for Volumetric Medical Image Segmentation," 2016 Fourth International Conference on 3D Vision (3DV), Stanford, CA, 2016, pp. 565-571, doi: 10.1109/3DV.2016.79.
Luna M., Park S.H. (2019) "3D Patchwise U-Net with Transition Layers for MR Brain Segmentation," In: Crimi A., Bakas S., Kuijf H., Keyvan F., Reyes M., van Walsum T. (eds) Brainlesion: Glioma, Multiple Sclerosis, Stroke and Traumatic Brain Injuries. BrainLes 2018. Lecture Notes in Computer Science, vol. 11383. Springer, Cham. https://doi.org/10.1007/978-3-030-11723-8_40.
Ronneberger O., Fischer P., Brox T. (2015) "U-Net: Convolutional Networks for Biomedical Image Segmentation," In: Navab N., Hornegger J., Wells W., Frangi A. (eds) Medical Image Computing and Computer-Assisted Intervention—MICCAI 2015. MICCAI 2015. Lecture Notes in Computer Science, vol. 9351. Springer, Cham. https://doi.org/10.1007/978-3-319-24574-4_28.
Hanchao Li, Pengfei Xiong, Jie An, Lingxue Wang (2018) "Pyramid Attention Network for Semantic Segmentation", BMVC 2018.
Huikai Wu, Junge Zhang, Kaiqi Huang, Kongming Liang, Yizhou Yu (2019) "FastFCN: Rethinking Dilated Convolution in the Backbone for Semantic Segmentation", CoRR abs/1903.11816.

* cited by examiner

METHOD AND SYSTEM FOR AUTOMATED SEGMENTATION OF BIOLOGICAL OBJECT PARTS IN MRI

CROSS-REFERENCE TO RELATED APPLICATION

This application claims the priority, under 35 U.S.C. § 119, of European Patent Application EP 20215993.5, filed Dec. 21, 2020; the prior application is herewith incorporated by reference in its entirety.

FIELD AND BACKGROUND OF THE INVENTION

The present disclosure is directed, in general, to imaging techniques for imaging biological objects, such as a brain, and more specifically to anatomical structure segmentation. More specifically, the present invention is directed to methods and systems for automated 3D segmentation of human body parts in Magnetic Resonance Imaging (MRI).

The amount of imaging data that must be analyzed by radiologists has greatly increased over the past decades. Providing automated segmentation algorithms, i.e. computer programs that outline features in an image, may help to address that problem by supporting the decision making of the radiologist. Since that has great impact on patient outcome, providing good quality measures for the segmentation algorithms poses yet another problem.

Image segmentation is a traditional computer vision problem. Over past decades, many works, from simple methods such as thresholding and region-growing, to more advanced ones such as active contours and Markov random fields, have been developed and published to address that task in medical imaging. In recent years, due to the success of deep learning models and convolutional neural networks (CNNs), a new generation of image segmentation methods has been released and proved to often achieve the highest accuracy rates on various benchmarks. Among CNN-based approaches, two main types of 3D segmentation approaches are particularly interesting:

The first one is a 3D segmentation based on 2D slices. Similar to the techniques described in Akkus et al. [1] and Milletari et al. [2], that first type of approach proposes to break down the 3D volumes into 2D slices and then process each slice independently by using a deep learning-based segmentation method. Finally, a 3D segmentation map is achieved by applying the same method for each slice and concatenating the results. The deep learning-based networks can be categorized based on their main technical contributions into many categories (e.g. Fully convolutional networks, Encoder-decoder based models, pyramid network based models, etc.).

Although the concatenating 2D segmentations result in promising segmentation maps, they have the following limitations:
- since the segmentation is based on 2D slices, those approaches lack considering information from the third dimension, which proved to increase the accuracy of 3D segmentation;
- not considering the third dimension results in inconsistency between labels in different slices.

The second type is an end-to-end 3D segmentation (see for instance Luna, et al. [3]). According to that approach, the input of the CNN is the whole 3D volume and a 3D segmentation map is expected at the output level as well.

Although the information from the third dimension is considered for segmentation, it still has the following limitations:
- a single representation for the whole 3D scan requires a CNN-based model with more parameters available at training time than for a 2D segmentation, which results in more complex problems to solve. More complex models usually require more labelled training examples which are difficult to access especially in medical imaging;
- in 2D-based approaches, each scan contains multiple examples for training (i.e. each slice within a 3D volume), however, that approach only brings one example from each scan. Considering the importance of having a large number of labelled data for supervised CNN-based methods, that has a major negative effect on the final results;
- that approach practically works only for scans with relatively small resolutions, since increasing the model sizes leads to memory constrains on current day standard hardware and devices.

In order to cope with the above-mentioned issues for end-to-end 3D segmentation, a patch-based 3D segmentation has been proposed as described in the paper "3D Patchwise U-Net with Transition Layers for MR Brain Segmentation" [3]. It is proposed to break down to small overlapping patches and process each patch independently. Since the patches are overlapping, multiple decisions will be available at the output for each voxel. The authors further suggest taking the decision with respect to maximum score for each voxel. That approach solves the memory issues mentioned in the previous category, however, it has the following weaknesses/drawbacks:
- since the patches are significantly smaller than the main volume, the network does not see the context around the questioned area;
- the scores returned by the CNN-based networks are known to not be correlated to the actual confidence level, therefore, multiple decision at each voxel does not help to improve the robustness.

SUMMARY OF THE INVENTION

It is accordingly an object of the invention to provide a method and a system for automated segmentation of biological object parts in MRI, which overcome the hereinafore-mentioned disadvantages of the heretofore-known methods and systems of this general type and which are capable of improving the current techniques by automatically segmenting an arbitrary object from an image of the latter, notably a 3D image, e.g. in medical imaging.

This objective is achieved according to the present invention by a method and a system for automated segmentation, notably 3D segmentation, of anatomical structures according to the object of the independent claims. Dependent claims present further advantages of the invention. The present invention further proposes to estimate a human readable confidence score corresponding to the quality of the automatic segmentation. Indeed, the confidence score, i.e. a metric that indicates how confident the automatic segmentation is, is important for quality control.

The present invention is based on a new concept which benefits for instance from contextual information in 3D images to predict 3D segmentation maps, and to estimate a confidence score that is an indication of the level of confidence of the final prediction.

More precisely, with the forgoing and other objects in view, there is provided, in accordance with the invention, a computer-implemented method for automated segmentation, notably 3D segmentation, of anatomical structures of a biological object, the method comprising:

acquiring an image of the object, preferentially a 3D image (or volume) of the object, wherein the image is constructed from a set of D slices s_i (e.g. contiguous sections of the volume), with i=1, ..., D. Any suitable 2D multi-slice MRI imaging technique or 3D (volume) MRI imaging technique might be used for acquiring the 3D image of the object. The 3D image is thus a concatenation of the D slices, wherein each slice s_i is an image of a section S_i of the object typically obtained using a known MRI imaging technique. Preferentially, the slices s_i are consecutive slices, i.e. the sections S_1 to S_D are consecutive sections of the object, S_1 being the first section of the object and S_D the last section defined for instance along a predefined axis of image acquisition. While in the rest of the present description of the invention, we will focus on an acquired image being a 3D image constructed from a succession of slices and used as input in a neural network, the present invention may also work for an acquired image being a temporal evolution of a thin slice (2D) or of a thicker slice (3D) of the biological object imaged at different times (in other words, the time replaces in this case the third space dimension of the 3D image), wherein each slice of the claimed set of slices is then the image of the thin (2D) or thick (3D) section of the biological object, but taken at different times);

dividing the set of D slices into overlapping groups G_j of N consecutive slices. Preferentially, before dividing the set of D slices into the overlapping groups G_j of N consecutive slices, a processing unit is configured for adding, e.g. by using a zero-padding technique, at least one additional imaginary slice to the set of D slices so that by dividing a new set including the D slices and the at least one additional slice into overlapping groups of N consecutive slices, a whole number of groups of N consecutive slices is obtained (i.e. so that at the end of the division, all groups include N slices). The imaginary slices are typically artificially created slices distinguished by a size identical to the size of the object slices and whose voxel values are typically 0. Preferentially, the zero-padding technique is used by the processing unit for adding to the set of D slices N—O imaginary slices arranged before the first slice. Advantageously, this ensures that the first slice of the set of D slices belongs to at least two groups of N consecutive slices. Similarly, the zero-padding technique might be used by the processing unit for adding imaginary slices consecutively after the last slice so that the last slice belongs to at least one group of N slices. The processing unit might thus be configured, using notably the zero-padding technique, for making the size of the neural network input larger so that the first slice belongs to at least two groups and the last slice belongs to a group including N consecutive slices. In function of an overlapping order O, additional imaginary slices might also be added by the processing unit after the last slice so that the latter also belongs to two groups of N slices. Each group G_j represents thus a sub-volume of the object, the sub-volume being defined by the N consecutive slices. Overlapping means that each group includes at least one slice among the N consecutive slices that is in common with another of the groups, which is in particular either a directly previous or directly next group in case of consecutive groups of consecutive slices. In other words, at least a part of the sub-volume, represented for instance by one or several of the consecutive slices, is shared with another of the groups. For instance, at least one slice of the group G_j belongs also to the group G_j+1 and/or G_j−1. In particular, for each group included between the first group and the last group of N consecutive slices, at least one slice is shared with a directly previous group and at least one another slice is shared with a directly next group. According to another example, if s_x is the first of the consecutive slices for group G_j, and s_z the last of the consecutive slices, then the last consecutive slice of the group G_j−1 is s_x and the first consecutive slice of the group G_j+1 is s_z if each overlapping group has only 1 slice in common and G_j is neither the first group nor the last group. A higher order O of overlapping might take place, wherein more than only the first and/or last, e.g. the two first slices and/or the two last slices, overlap with the previous and/or respectively next group. Preferentially, O=N−1, which means that only the first slice of a group is not part of the next group, or in other words, each group G_j has N−1 slices in common with the previous group (i.e. the N−1 first slices of the N consecutive slices) and also N−1 slices in common with the next group (that are the N−1 last slices of the N consecutive slices) apart for the first group and the last group which have respectively N−1 slices in common with the next group and N−1 slices in common with the previous group. For instance, if N=5 and the overlapping order O is 1 (i.e. only 1 slice in common with the previous group and next group for groups included between the first group and the last group) and G_j includes the consecutive slices {s_k−2,s_k−1,s_k,s_k+1, s_k+2}, then G_j−1 includes {s_k−6,s_k−5,s_k−4,s_k−3,s_k−2} and G_j+1 includes {s_k+2,s_k+3,s_k+4,s_k+5, s_k+6};

feeding each of the obtained overlapping groups of N consecutive slices as input into a neural network, e.g. a CNN-based segmentation network, configured for outputting, for each inputted group, N labelled maps, wherein for each slice of the inputted group there is one labelled map outputted by the neural network, wherein each voxel of the labelled map has been labelled according to a specific label determined by the neural network, e.g. chosen among a set of specific labels that is for instance predefined by the system according to the invention for the biological object, on the basis of the inputted slices so as to segment the slice in different parts, wherein each part is a group of directly neighboring voxels (i.e. adjacent voxels) having each an identical specific label. The neural network is configured for segmenting each slice of each inputted group into anatomical structures of the biological object and assigning one of the specific labels included in the set to each voxel of each of the inputted slices in order to create a labelled map for each of the inputted slices. The set of specific labels might include two or more specific labels (e.g. one specific label can be "background" and another specific label can be "body part" in case of binary labels). Known in the art CNN-based segmentation network might be used. For instance, any state-of-the-art semantic segmentation can be used like U-Net [4], a seminal work of encoder-decoder type of network. Other techniques might be based on "Spatial Pyramid pooling" approaches (e.g. "Pyramid Attention Network for Semantic Segmentation", 2018 [5]) or on "dilated convolutions" such as "FastFCN: Rethinking Dilated Convolution in the Backbone for Semantic Segmentation", 2019 [6].

for each slice for which several (i.e. at least two) labelled maps have been created or obtained (i.e. outputted by the neural network), determining for each voxel of the slice a final label from the specific labels obtained for the voxel in the several labelled maps, i.e. when considering each of the several labelled maps. For instance, the final label might be obtained using a majority vote method, wherein the final label is the specific label that won the majority of the votes when considering the different specific labels assigned to the voxel in the several labelled maps (in other words, for each voxel of the slice, the processing unit according to the present invention is configured for counting how many times a same specific label has been attributed to the voxel by the neural network when considering the several labelled maps outputted/obtained for the slice, and the specific label that has been attributed to the voxel more than half of the total number of the labelled maps is chosen by the processing unit as the final label). In particular, if two different specific labels obtain the same number of votes, i.e. each of the two different specific labels has been assigned to a same voxel a same number of times, then the processing unit is configured for assigning to the voxel the specific label that is statistically the most probable when considering a training dataset that has been used for training the neural network or for which the neural network outputted the highest prediction score. Other alternatives techniques might be used for determining the final label. For instance, instead of majority vote, probabilities might be used, resulting at the end in the creation of labelled maps that are probabilistic segmentation maps wherein each voxel is associated to a value corresponding to the highest probability of being assigned to a specific label (e.g. the probability of specific label A is 66% and the probability of specific label B is 33%, then the value 66% is chosen for the voxel and associated to the specific label A);

for each slice for which several labelled maps have been outputted, outputting a final segmentation labelled map that is a map of the final labels obtained for the voxels of the considered slice. In other words, each voxel of the final segmentation labelled map has been labelled according to the final label determined for the considered voxel in the previous step;

optionally, if there is a slice for which only a single labelled map has been created or obtained, then automatically creating a final segmentation labelled map for the slice from the single labelled map. For instance, the final segmentation map for the slice can be the single labelled map. Alternately, if only the first slice and/or the last slice are/is the slice(s) for which only a single labelled map has been created or obtained, then the processing unit is configured for ignoring the slice(s) for the next step (for instance by deleting the slice from the set of slices), since usually the first and/or last slice are/is not containing body parts or any important information;

creating a final segmented image of the object, preferentially a final 3D segmented image, including the final segmentation labelled map. The final 3D segmented image is a 3D image of the biological object segmented in several 3D parts, i.e. including segmented 3D parts that represent the different anatomical structures of the biological object. In particular, the final 3D segmented image is obtained by concatenation of the outputted final segmentation labelled maps.

Optionally, the method may include automatically computing a confidence score SC for at least one of the segmented 3D parts of the final 3D segmented image. The confidence score SC is notably based on the relation between the number of total votes for a specific label and the maximum number of the possible votes for that specific label. Preferentially the confidence score SC is computed from the total number TN_FL of votes that the final label won for this part when considering each of the voxels of the part that belongs to a slice for which several labelled maps have been created or obtained (i.e. for all voxels of this part belonging to such slices) divided by the total number TN of votes that have been considered for the segmented part and which is obtained by summing over each slice belonging to the segmented part and for which multiple labelled maps have been created the number of votes that have been assigned to the considered slice when considering all of its voxels. For this purpose, the processing unit might be configured for:

determining for each voxel V of the segmented part that belongs to a slice for which several labelled maps were obtained or created:
the number N_VFL of votes obtained for the final label (i.e. the number of times the final label was assigned to the voxel by the neural network);
the total number of votes N_VT (i.e. of specific labels that have been assigned to the considered voxel, the number corresponding actually to the number of labelled maps created for the slice to which the considered voxel belongs to);
the voxel score S_V=N_VFL/N_VT obtained for each voxel; and/or determining, for each slice for which multiple labelled maps were created, a slice score S_S, wherein the latter is given by:

$$S\_S = \frac{\sum_{voxel} N\_VFL}{\sum_{voxel} N\_VT} = \frac{\sum_{voxel} N\_VFL}{N \cdot K},$$

with K=number of voxels within the considered slice that belong to the segmented part and N=number of labelled maps created for the considered slice; and/or determining for the segmented part the confidence score SC:

$$SC = \frac{TN\_FL}{TN} = \frac{\sum_{slices} \sum_{voxels} N\_VFL}{\sum_{slices} \sum_{voxels} N\_VT},$$

wherein the slices considered for the calculation are the slices belonging to the segmented part and for which several labelled maps were created or obtained, wherein the confidence score is thus obtained by determining the total number of votes assigned to the final label divided by the total number of votes assigning a specific label when considering all voxels of the segmented part that belong to slices for which several labelled maps were determined.

The present invention also relates to a system configured for automatically performing a 3D segmentation of anatomical structures of a biological object by carrying out the steps of the previously described method.

The system includes, for instance:
- optionally, an imaging system, like the imaging system of an MRI apparatus, or an MRI apparatus, configured for acquiring MRI data from scanning the biological object, the MRI data being configured for enabling a construction of a 3D image of the biological object;
- a memory for storing the MRI data and/or the 3D image;
- a processing unit including a processor, the processing unit being configured for processing the MRI data and/or the 3D image;
- optionally a display for displaying a final 3D segmented image of the biological object;

wherein the processing unit is configured for automatically carrying out the previously described method.

The foregoing has broadly outlined the features and technical advantages of the present disclosure so that those skilled in the art may better understand the detailed description that follows.

Additional features and advantages of the disclosure, which will be described hereinafter, form the object of the claims. Those skilled in the art will appreciate that they may readily use the concept and the specific embodiment disclosed as a basis for modifying or configuring other structures for carrying out the same purposes of the present disclosure.

Although the invention is illustrated and described herein as embodied in a method and a system for automated segmentation of biological object parts in MRI, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
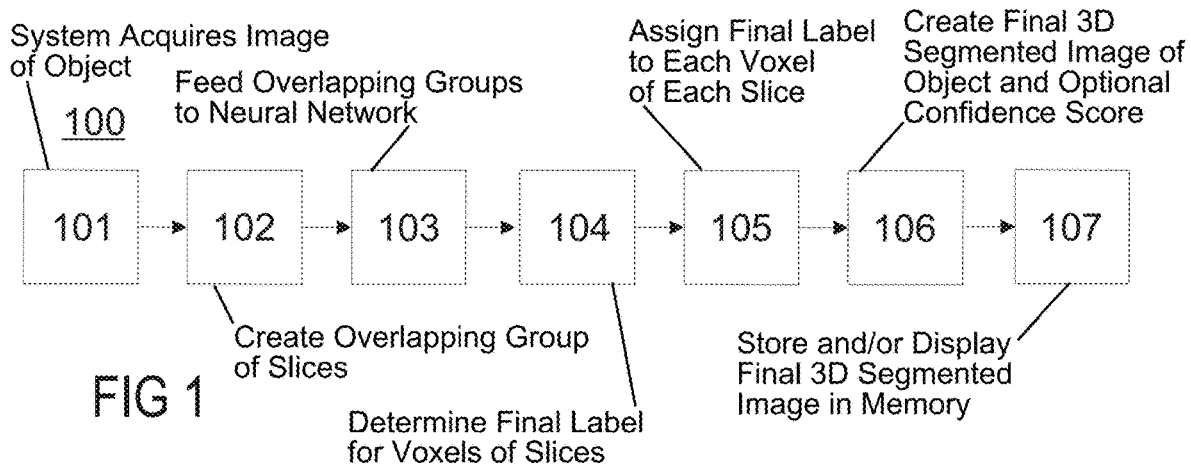
FIG. 1 is a flowchart illustrating a method for automatically segmenting anatomical structures of a biological object according to the invention.
Figure 2:
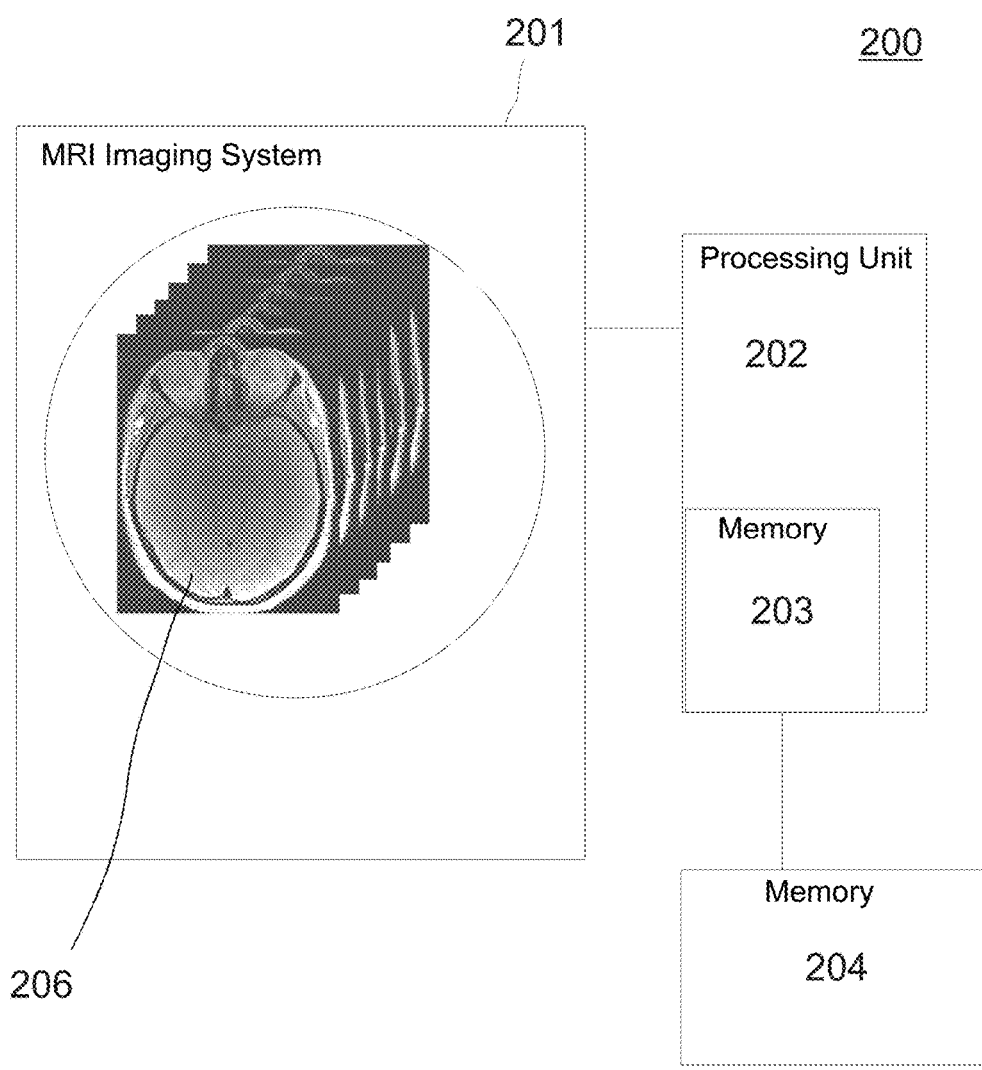
FIG. 2 is a block diagram illustrating a system for implementing the claimed method.
Figure 3:
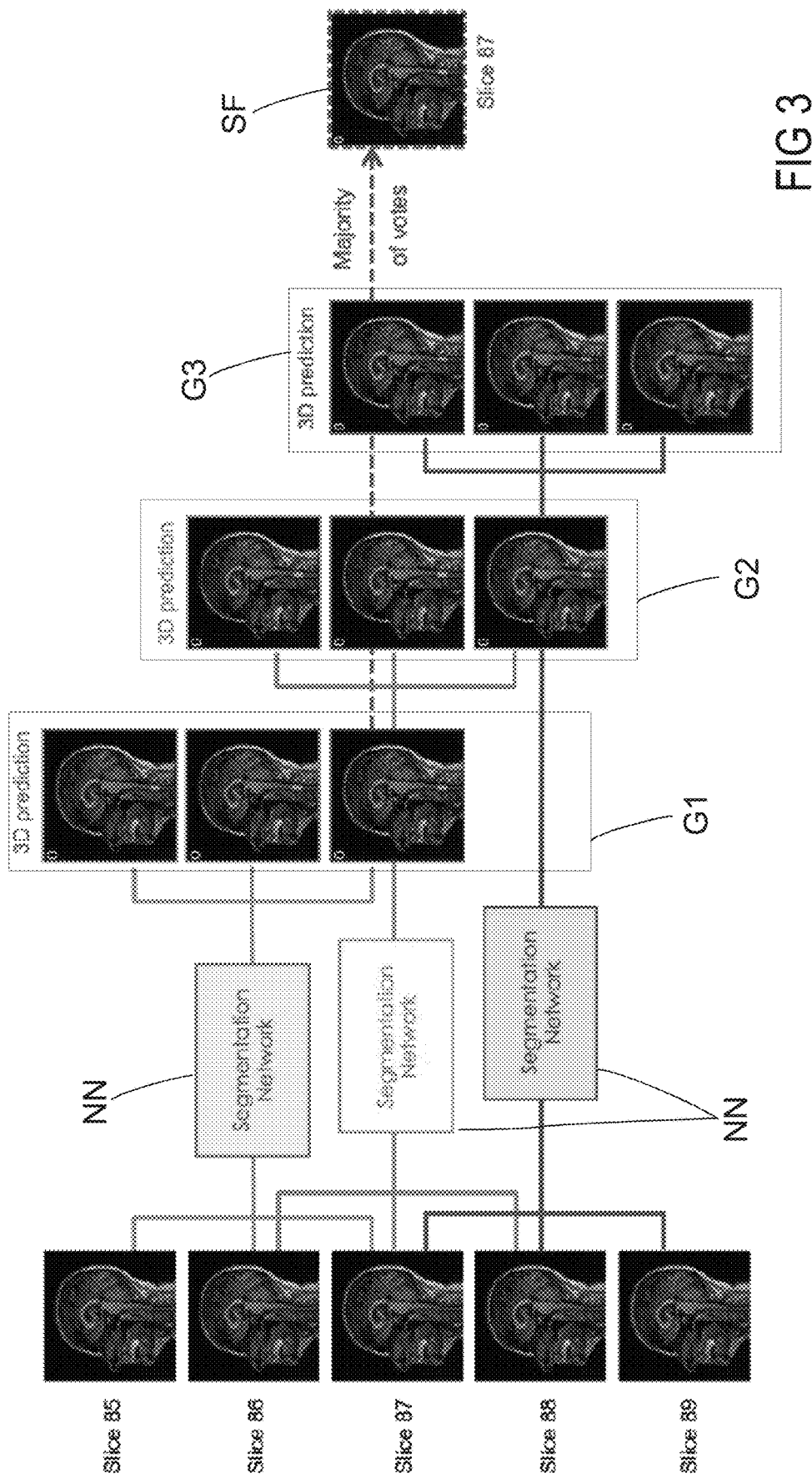
FIG. 3 is a block diagram illustrating an example of a determination of a final label for each voxel of a slice of the biological object.

Reference is now made to FIGS. 1 to 3 of the drawings discussed below, and the various embodiments used to describe the principles of the present disclosure in this patent application, which are provided by way of illustration only and should not be construed in any way to limit the scope of the disclosure. Those skilled in the art will understand that the principles of the present disclosure may be implemented in any suitably disposed device. The numerous innovative teachings of the present application will be described with reference to exemplary non-limiting embodiments.

We will now describe in more details the method 100 and the system 200 according to the invention, wherein FIG. 1 describes the different steps of the method 100 preferentially implemented by using a computer, and FIG. 2 schematically presents the system 200 according to the invention configured for carrying out the automatic segmentation of anatomical structures of a biological object according to the steps of the method 100.

At step 101, the system 200 according to the invention acquires a 3D image of a biological object, e.g. a brain. For this purpose, the system 200 may include an MRI imaging system 201 configured for acquiring MRI signal data for the biological object in order to create the 3D image of the latter. Alternatively, a processing unit 202 of the system 200 according to the invention may acquire the 3D image from a database or another device. According to known MRI techniques, the 3D image is constructed from a set of D slices $s\_i$, wherein the 3D image is for instance obtained by concatenation of the slices $s\_i$ 206, each slice being an image of a thin section of the biological object, all sections/slices being parallel to a slice plane. The slices all have an identical size. In other words, the slices are considered as 2-dimensional slices that, joined together, produce or create the 3D image of the biological object. According to the present invention, the processing unit 202 might be configured for processing the MRI signal data for reconstructing the 3D image from the latter, by creating for instance the set of D slices. The 3D image might be stored in a memory 203 of the processing unit 202.

At step 102, the processing unit 202 is configured for creating overlapping groups of N consecutive slices $s\_i$. FIG. 3 shows an example of overlapping groups obtained for a set of 5 slices (slice 85 to slice 89) with N=3 and an overlapping order O=N−1=2. The overlapping order O, with O≥1, corresponds to the number of slices which are in common for two neighboring or adjacent groups and is preferentially equal to N−1. For instance, according to the example of FIG. 3, a first group includes the slices 85-87, a second group includes the slices 86-88, and a third group includes the slices 87-89, wherein the groups are consecutive groups so that the slices of the groups remain consecutive slices. Each group has two slices in common with each of its neighboring groups. Depending on the number of slices included within the set of D slices and the value of N, the processing unit 202 might be configured for automatically creating D' imaginary slices (D'>0) and adding the latter to the set of D slices in order to create a new set of D+D' slices that is used as input for creating the overlapping groups of N slices instead of directly using the set of D slices as input. The goal is that, by using the new set of D+D' slices, each slice of the set of D slices belongs at least to one overlapping group of N consecutive slices when dividing the new set including D+D' slices into the overlapping groups of N consecutive slices. The imaginary slices are preferentially created using a zero-padding technique. Preferentially, if only the first and the last slice are slices that would belong to a single group of consecutive slices, then the processing unit uses the zero-padding technique for increasing the number of slices of the set of D slices so that both the first and last slice belong to at least two groups of N consecutive slices.

At step 103, the processing unit 202 is configured for feeding each of the overlapping groups as input into a neural network. The latter is configured for segmenting each slice of an inputted group into anatomical structures of the biological object and assigning to each of the voxel of the slice a specific label yielding, for each slice of an inputted group, in the creation of a labelled map.

The labelled map associated to a slice is thus the (slice) image of a thin section of the biological object, wherein a label has been assigned by the neural network to each voxel of the image. The neural network is preferentially a CNN-based segmentation network. FIG. 3 shows for instance three groups G1, G2, G3 of labelled maps resulting from the segmentation of the slices of respectively the first group of overlapping slices, the second group of overlapping slices and the third group of overlapping slices using the neural network NN.

At step 104, the processing unit 202 is configured for determining a final label for each voxel of each slice for which several labelled maps have been outputted by the neural network NN (i.e. of each slice belonging to several overlapping groups). Typically, for a very same voxel of a slice, a first specific label might have been assigned by the neural network when considering a first overlapping group, and a second specific label might have been assigned to the voxel when considering a second overlapping group. In other words, for the very same voxels, different specific labels might have been assigned by the neural network when considering the different labelled maps outputted for the considered slice in function of the group of slices that was used as input in the neural network. The final label is preferentially determined by a majority vote method implemented by the processing unit 202, and wherein the specific label that has been predominantly assigned to a voxel when considering the several labelled maps is chosen by the processing unit 202 as the final label. Other techniques for determining the final label might be chosen. The final label assigned to a voxel is thus the specific label mostly appearing for the voxel in the several maps.

At step 105, the processing unit 202 is configured for assigning to each voxel of each slice for which several labelled maps were outputted, the final label obtained for the considered voxel, in order to create a final segmentation labelled map. Such a final segmentation map SF is shown in FIG. 3 and has been obtained for the slice 87 by considering the three labelled maps obtained for the slice 87 and belonging respectively to the groups G1, G2 and G3. Preferentially, if the set of D slices includes a slice for which only one single labelled map has been outputted by the neural network NN, then the single labelled map is chosen by the processing unit as being the final segmentation labelled map.

At step 106, the processing unit 202 is configured for creating a final 3D segmented image of the object from the previously obtained final segmentation labelled map(s), e.g. by concatenation of the latter.

At step 107, the processing unit 202 might store the final 3D segmented image in the memory 203 and/or display the latter on a display 204, the 3D segmented image being a 3D image of the biological object segmented in different 3D parts wherein at least one of the 3D parts represents an anatomical structure of the biological object.

Optionally, the processing unit 202 might be further configured, notably at step 106, for calculating a confidence score for at least one of the segmented parts of the biological object. The confidence score is preferentially computed as the sum over each voxel of the considered segmented part of the number of times the considered voxel was assigned the final label divided by the sum over each voxel of the considered part of the number of specific labels assigned to the considered voxel, when considering only voxels belonging to slices for which multiple labelled maps were created. Optionally, such a confidence score might also be calculated for each individual voxel in order to indicate regions of the segmented part that have been difficult to segment.

FIG. 2 schematically illustrates an embodiment of a system 200 according to the invention. The system 200 is configured for automatically segmenting anatomical structures of a biological object. The system 200 includes:

optionally, the MRI imaging system 201, for acquiring MRI signal data for the biological object in order to create a 3D image of the latter;

the memory 203 for storing the 3D image of the biological object;

the processing unit 202 connected to the MRI imaging system 201 and/or to another device. The processing unit 202 preferentially includes the memory 203. The processing unit 202 further includes notably a processor configured for processing the acquired MRI signal data and creating the 3D image. The processing unit 202 might also acquire the 3D image from the other device, e.g. a database;

optionally, a display 204 for displaying the 3D image;

the system 200 being configured for carrying out the steps of the previously described method.

FIG. 3 is a schematic view of steps 102-105 of the previously described method wherein a set of slices, i.e. slices 85-89 is used for forming 3 overlapping groups of 3 consecutives slides, each group being used as input in a neural network NN configured for segmenting each of the inputted images (slices) and assigning to each voxel of the considered slice a specific label. For each inputted group, an outputted group G1, G2, G3 is outputted by the neural network, wherein each outputted group G1, G2, G3 includes labelled maps, each labelled map being a segmented and labelled image of an inputted slice. All labelled maps obtained for a same slice, e.g. for slice 87, are then used for determining a final label for each voxel of the considered slice.

Advantageously, the proposed method benefits from a 2D-based segmentation seminal architecture (e.g. U-Net [4] in this case), differing only in the number of nodes at its input and output layers. Therefore, it has the same range of computational complexity and inference time as 2D-based approaches. Additionally, the present method has been shown as producing more robust and consistent segmentation labels compared to existing techniques. It benefits from 3D data while having the same range of computational cost as previous 2D CNN-based methods, which makes it practical. Finally, the calculation of a confidence score for the whole segmentation label or individual voxels, that correlates with the human perception of confidence, enables an easy estimation of a quality of the segmentation.

LIST OF CITATIONS

[1] Akkus, Z., Galimzianova, A., Hoogi, A. et al. "Deep Learning for Brain MRI Segmentation: State of the Art and Future Directions,". J Digit Imaging 30, 449-459 (2017).

[2] F. Milletari, N. Navab and S. Ahmadi, "V-Net: Fully Convolutional Neural Networks for Volumetric Medical Image Segmentation," 2016 Fourth International Conference on 3D Vision (3DV), Stanford, alif. A, 2016, pp. 565-571, doi: 10.1109/3DV.2016.79.

[3] Luna M., Park S. H. (2019) "3D Patchwise U-Net with Transition Layers for MR Brain Segmentation," In: Crimi A., Bakas S., Kuijf H., Keyvan F., Reyes M., van Walsum T. (eds) Brainlesion: Glioma, Multiple Sclerosis, Stroke and Traumatic Brain Injuries. BrainLes 2018. Lecture Notes in Computer Science, vol 11383. Springer, Cham. https://doi.org/10.1007/978-3-030-11723-8_40

[4] Ronneberger O., Fischer P., Brox T. (2015) "U-Net: Convolutional Networks for Biomedical Image Segmentation," In: Navab N., Hornegger J., Wells W., Frangi A. (eds) Medical Image Computing and Computer-Assisted Intervention—MICCAI 2015. MICCAI 2015. Lecture Notes in Computer Science, vol 9351. Springer, Cham. https://doi.org/10.1007/978-3-319-24574-4_28

[5] Hanchao Li, Pengfei Xiong, Jie An, Lingxue Wang (2018) "Pyramid Attention Network for Semantic Segmentation", BMVC 2018.

[6] Huikai Wu, Junge Zhang, Kaiqi Huang, Kongming Liang, Yizhou Yu (2019) "FastFCN: Rethinking Dilated Convolution in the Backbone for Semantic Segmentation", CoRR abs/1903.11816.

The invention claimed is:

1. A computer-implemented method for automated segmentation of anatomical structures of a biological object, the method comprising:

acquiring a magnetic resonance imaging (MRI) image of the object, the MRI image being constructed from a set of D slices s_i;

dividing the set of D slices s_i into overlapping groups G_j of N consecutive slices;

feeding each of the overlapping groups of N consecutive slices as an input into a neural network configured for outputting, for each inputted group, N labelled maps, one labelled map being outputted by the neural network for each slice of the inputted group, and each voxel of the labelled map having been labelled according to a specific label determined by the neural network based on the inputted slices;

for each slice belonging to several overlapping groups, determining for each of its voxels a final label from specific labels assigned to the voxel by the neural network when considering the labelled maps outputted for the considered slice;

for each slice belonging to several overlapping groups, assigning to each of its voxels the final label having been previously determined for the considered voxel and outputting a final segmentation map being a map of the final labels assigned to the voxels of the considered slice; and creating a final segmented image of the object from the previously obtained final segmentation maps.

2. The computer-implemented method according to claim 1, which further comprises automatically calculating a confidence score for a segmented part of the object.

3. The computer-implemented method according to claim 1, which further comprises providing the MRI image as a 3D image of the object and providing each slice as an image of a different thin section of the object.

4. The computer-implemented method according to claim 1, which further comprises providing the MRI image as a temporal evolution of a thin or thick section of the object and providing each slice as an image of the thin or thick section taken at a different time.

5. The computer-implemented method according to claim 1, which further comprises, before dividing the set of D slices s_i into overlapping groups G_j of N consecutive slices, automatically adding to the set of D slices at least one imaginary slice in order to create a new set including the D slices and each additional imaginary slice, and using the new set instead of the set of D slices for creating the overlapping groups of N consecutive slices.

6. The computer-implemented method according to claim 5, which further comprises adding N—O imaginary slices arranged before the first slice, wherein O is an order of overlapping of the overlapping groups.

7. The computer-implemented method according to claim 1, which further comprises when there is a slice for which only a single labelled map has been created or obtained, then automatically creating a final segmentation labelled map for the slice from the single labelled map.

8. The computer-implemented method according to claim 7, which further comprises providing the final segmentation map for the slice as the single labelled map.

9. The computer-implemented method according to claim 1, which further comprises determining the final label by using a voting method.

10. A system for automatically segmenting anatomical structures of a biological object, the system comprising:

a processing unit configured for at least one of processing MRI data in order to create an image of the object or acquiring the image from another device; and a memory for storing at least one of the image or the MRI data;

the processing unit being configured for carrying out the computer-implemented method according to claim 1.

* * * * *